May 4, 1965   J. W. CUTTER ETAL   3,181,650
PORTABLE TOWER CONSTRUCTION
Filed Dec. 23, 1963   7 Sheets-Sheet 1
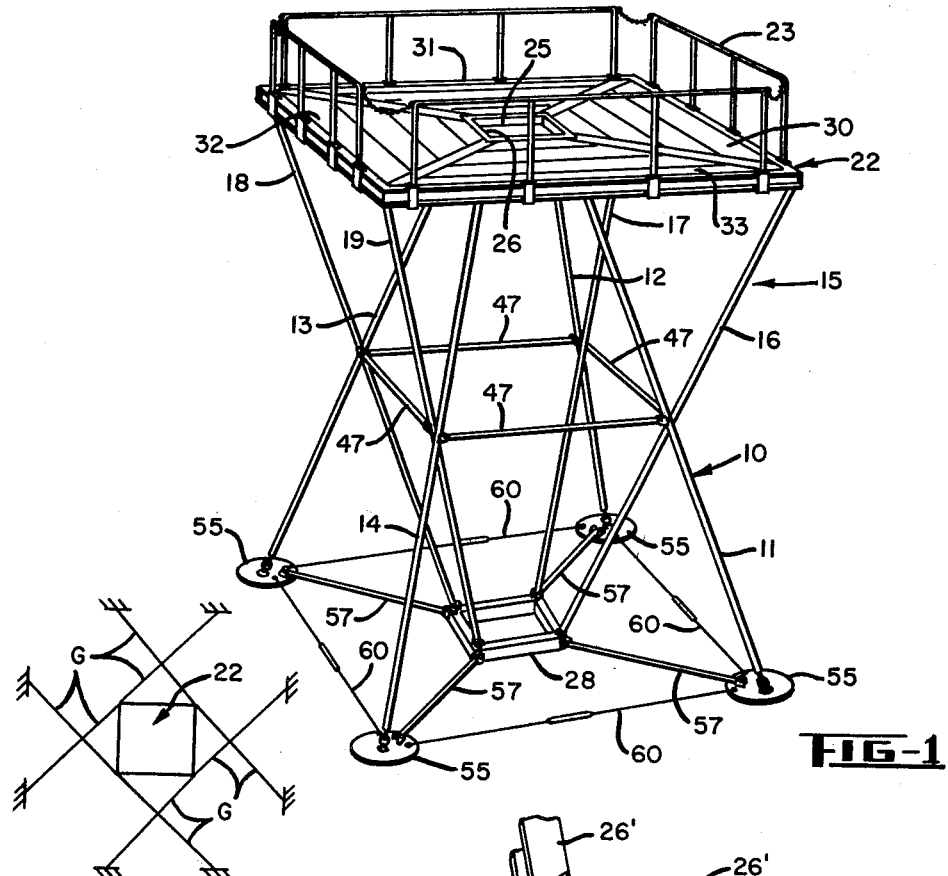
FIG-1
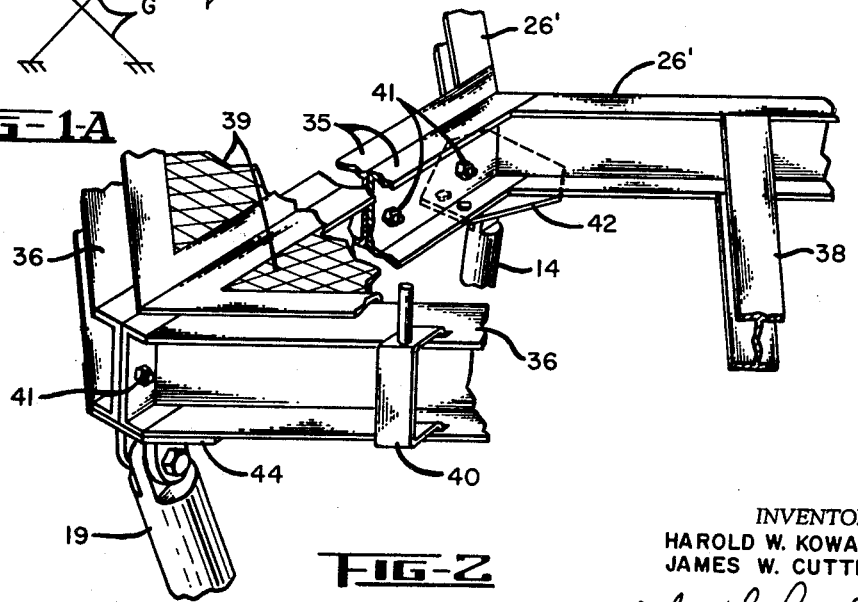
FIG-1A
FIG-2
INVENTOR.
HAROLD W. KOWAL
JAMES W. CUTTER
BY *John F. Lawler*
ATTORNEY

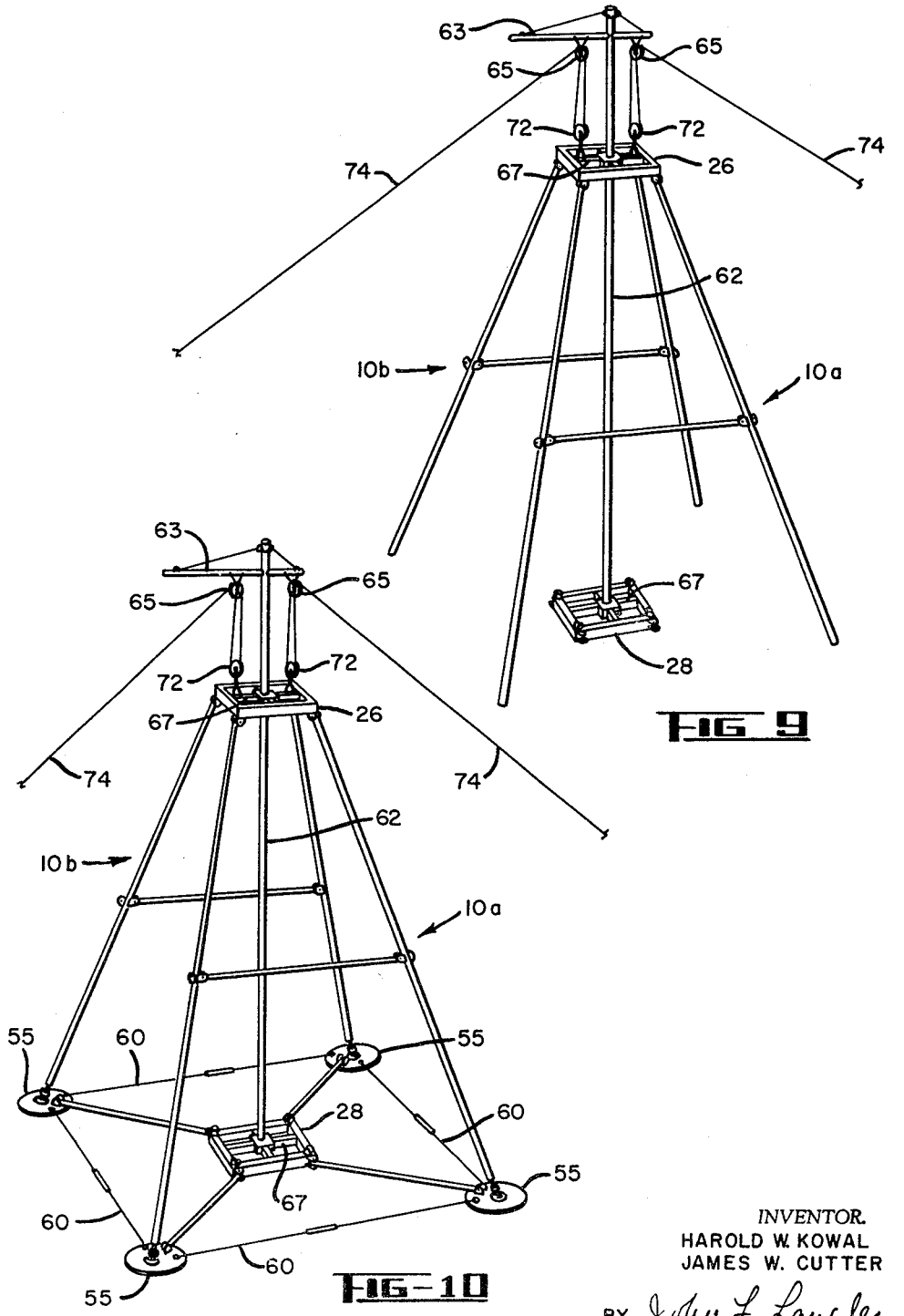

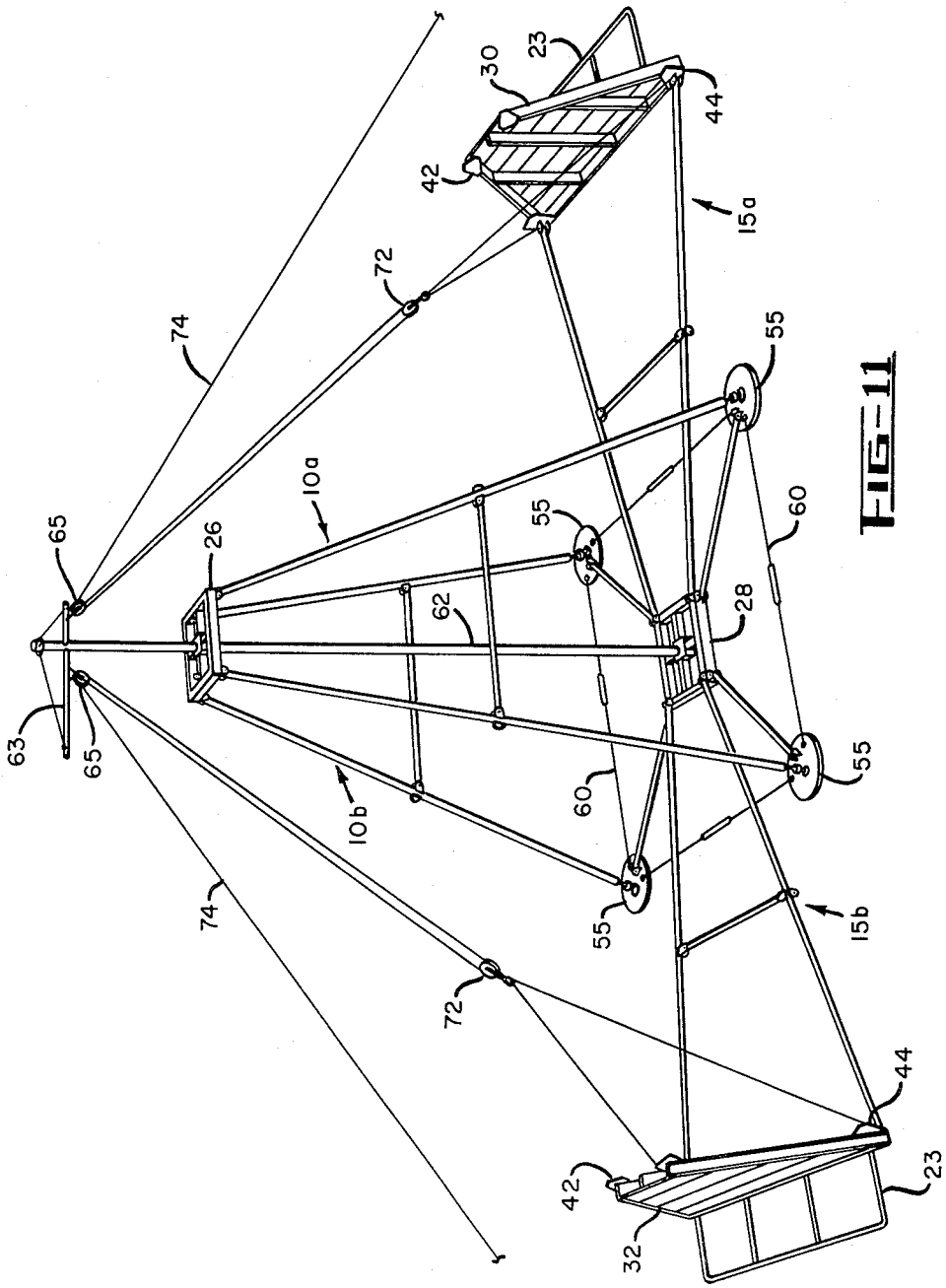

United States Patent Office 3,181,650
Patented May 4, 1965

3,181,650
PORTABLE TOWER CONSTRUCTION
James W. Cutter, Los Altos, and Harold W. Kowal, Campbell, Calif., assignors to Sylvania Electric Products Inc., a corporation of Delaware
Filed Dec. 23, 1963, Ser. No. 332,737
6 Claims. (Cl. 182—179)

This invention relates to towers and more particularly to an improved portable tower construction.

Relay stations for microwave communication links and similar operations often require towers to support equipment and personnel in elevated positions in the field. Because of the remoteness and inaccessibility of many field sites, there is difficulty in transporting material and equipment for erection of towers at those sites. While the problem is somewhat alleviated by the use of prefabricated towers that may be disassembled for shipment, there remains the difficulty of providing the necessary hoisting equpiment at the site for raising the tower sections in place. The bulk and weight of derricks or cranes generally used for erecting towers greater than twenty feet high limit their utility to more accessible sites.

An object of this invention is the provision of a highly portable field tower that is capable of erection without special heavy-duty hoisting equipment.

Another object is the provision of a tower that may be erected quickly with a minimum of labor and without special tools.

Another object is the provision of a low cost lightweight sturdy field tower.

Another object is the provision of such a tower in which access to the elevated platform is by a central opening in the platform.

In accordance with the invention, the tower comprises two coaxial truncated pyramidal frames arranged about the central axis of the tower with one of the frames inverted relative to the other. Each pyramidal frame is made of lightweight, preferably tubular, elements and comprises a pair of trapezoidal frames secured to each other at the base and platform levels by central open frames. Lightweight hoisting equipment is supported on a center column removably connected to the center frames and serves to lift the structural components into position. The elevated platform at the top of the tower lies in the base plane of the inverted truncated pyramidal frame. The separate structural members comprising the tower may be compactly stored for transportation to and from remote construction sites.

These and other objects of the invention will become apparent from the following description of a preferred embodiment thereof, reference being had to the accompanying drawings in which:

FIGURE 1 is a perspective view of a completed tower embodying the invention;

FIGURE 1A is a schematic plan view of the tower secured by guy wires;

FIGURE 2 is a perspective view of a corner portion of the platform as viewed from above and with the flooring broken away to show construction details;

FIGURES 8–12, inclusive are partially schematic views showing the remaining successive steps in the erection of the tower.

Figure 3:
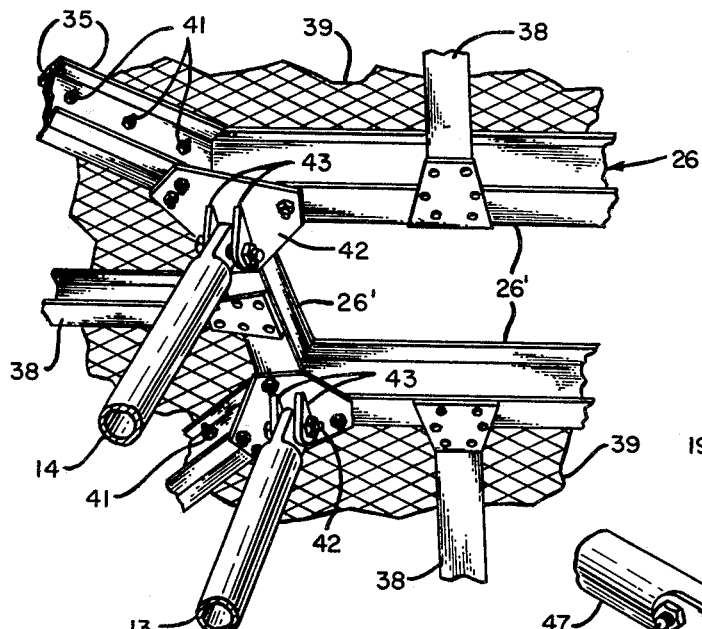
FIGURE 3 is a perspective view of a portion of the upper central frame as viewed from underneath.

Referring now to the drawings, a tower embodying the invention is shown in FIGURE 1 and comprises a first truncated pyramidal frame 10 including side members 11, 12, 13 and 14 and a second truncated pyramidal frame 15 having side members 16, 17, 18 and 19. Pyramidal frames 10 and 15 are coaxially disposed and are inverted with respect to each other so that the base plane of frame 10 is on the ground and the base plane of frame 15 is at the top of the tower. A platform 22 is secured to the upper ends of the members comprising frames 10 and 15 and has a guard rail 23 secured to the sides of the platform for safety purposes. The platform has a coaxial central opening 25 defined by a rectangular frame 26 and through which equipment and materials may be lowered from or raised to the platform. A similar frame 28 vertically aligned with frame 26 is adapted to rest on the ground or other supporting surface.

In order to securely anchor the tower when subjected to the force of high winds and the like, guy wires G, see FIGURE 1A, may be secured between the ground and the corners of the platform in the crossed pattern illustrated.

Platform 22 comprises four substantially identical trapezoidal sections 30, 31, 32 and 33 arranged symmetrically about the verical axis of the tower. Each floor section comprises side frame members 35, see FIGURES 2 and 3, which preferably are U-shaped structural elements, outer frame members 36 which preferably are I-beams, and one of the rectangular frame sides 26′ which also preferably is an I-beam or equivalent structure. One or more intermediate floor beams 38 connect section members 26′ and 36 and suitable flooring strips 39 made of screen or other lightweight material are supported on the section framing for carrying loads on the platform. Outer members 36 carry brackets 40 to receive and support the posts of guard rail 23.

Adjacent side frame members 35 of adjacent floor sections are secured together by bolts 41, see FIGURES 2 and 3, and are connected to the corners of center frame 26 by clevis plates 42 having clevis connectors 43 to which members 11–14, inclusive, of frame 10 are connected. The upper ends of members 16, 17, 18 and 19 of inverted frame 15 are connected to the corners of the platform 22 by clevis plates 44, see FIGURES 2 and 11, similar to plates 42 and which additionally serve to reinforce and secure the connection of the platform sections to each other. The connection of each of the side members of pyramidal frame 15 to clevis plate 44 preferably is at the junction of adjacent floor sections so that the load on the latter is uniformly applied to each such side member.

Figure 4:
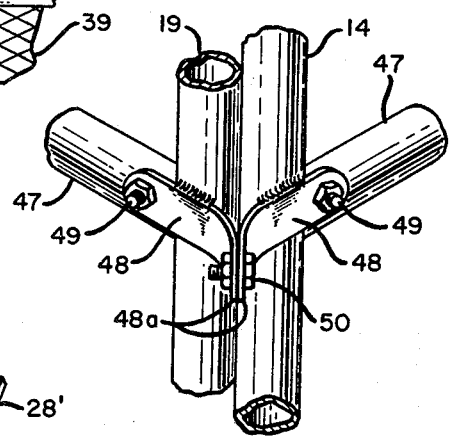
FIGURE 4 is a perspective view of the junction of adjacent pyramidal frame side members and braces intermediate the base and top of the tower.

The side members of truncated pyramidal frames 10 and 15 are reinforced midway between their ends by transverse braces 47, see FIGURES 1 and 4. Each brace is secured at each end to one of the frame side members by a pair of lugs 48 which are brazed to the member. Each pair of lugs 48 extends in one direction from the side member for connection to brace 47 by bolt 49 and extends in the opposite direction for connection by bolts 50 to the adjacent pair of lugs so as to lock the frame side members together. For the latter purpose, the lug extensions 48a are curved into juxtaposition as shown in FIGURE 4.

Figure 5:
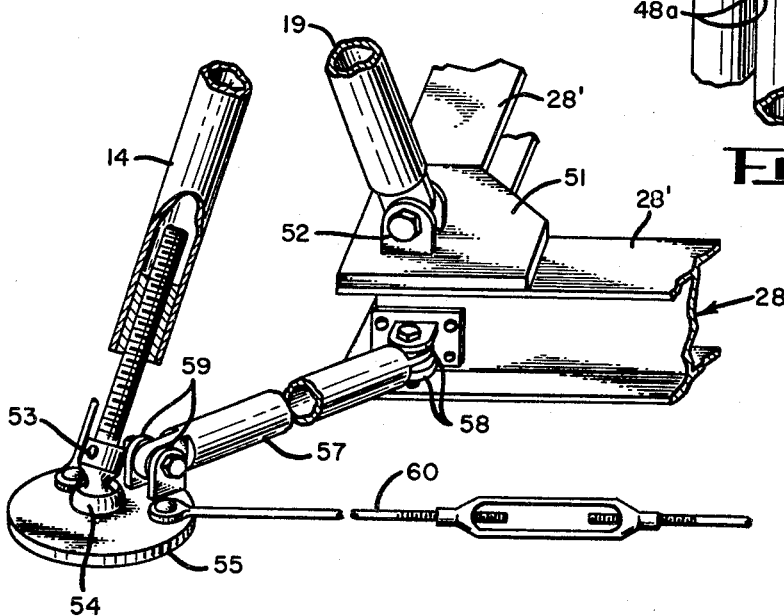
FIGURE 5 is a perspective view of a lower corner of the tower showing a corner plate and its connection to a side member and to the lower central frame.
Figure 6:
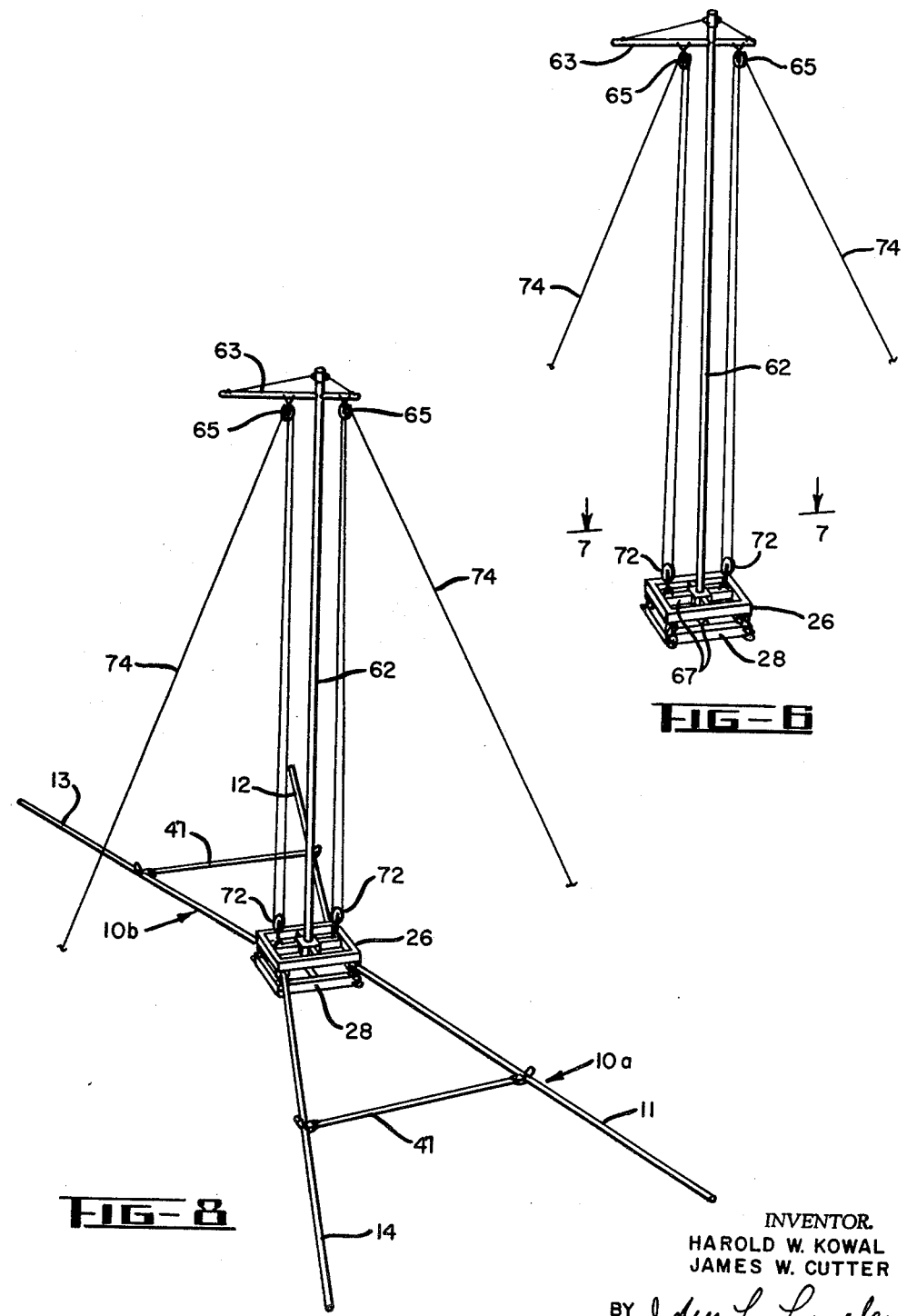
FIGURE 6 is the initial step in erecting the tower.
Figure 7:
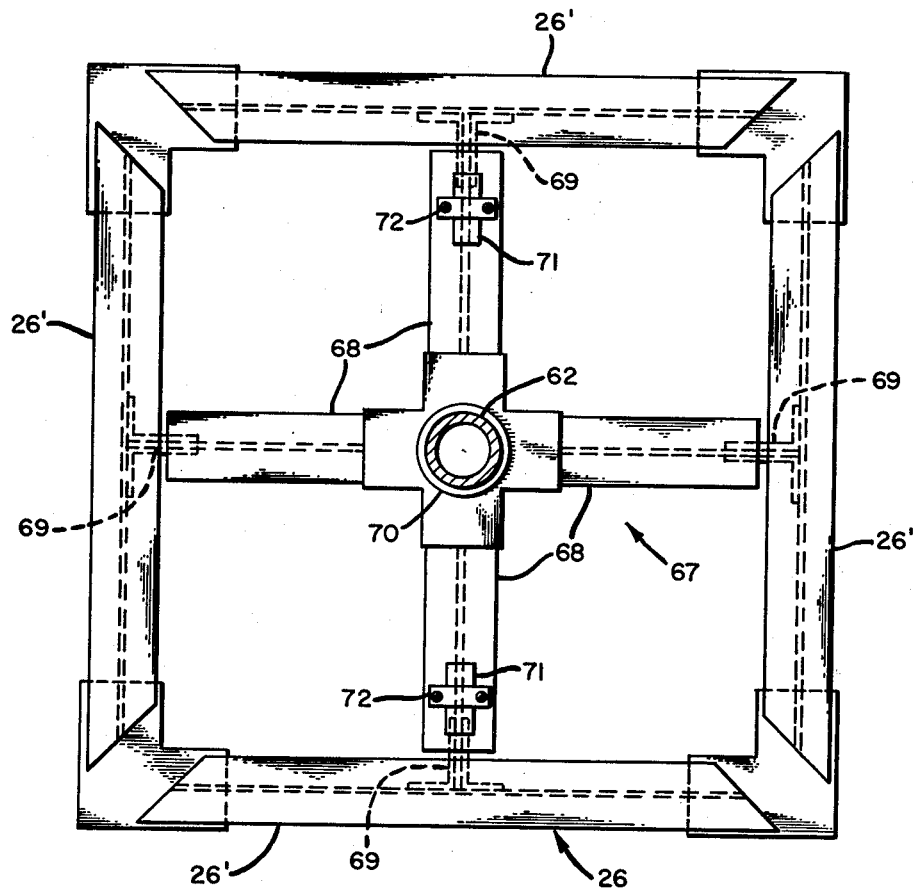
FIGURE 7 is a greatly enlarged section taken on line 7—7 of FIGURE 6 showing the upper central rectangular frame and spider.

The lower rectangular frame 28, see FIGURES 1 and 5, preferably comprises I-beams 28′ suitably secured together by plates 51. Frame 28 has the same dimensions as frame 26, is located coaxially of the tower and has a clevis connector 52 at each corner for receiving and securing the lower ends of side members 16, 17, 18 and 19 of frame 15. Each of the other frame side members 11, 12, 13 and 14 carries an adjustable ball element 53 which engages in a socket 54 formed on corner plate 55. Rectangular frame 28 is connected to each corner plate 55 by a diagonal member 57 secured to clevis connectors 58 and 59 on the rectangular frame and corner plate, respectively. The corner plates are connected to each other by tension rods 60.

The structural members which comprise the tower preferably are of lightweight construction, tubing preferably being used for the side members, braces and diagonal members. It will be noted that substantially all the interconnecting parts are removably connected to facilitate disassembly of the tower parts into component packages convenient in size and weight for transportation. The eight frame side members are substantially identical as are the braces 47, diagonal members 57, and corner plates 55 thereby enabling economical mass production of tower parts with consequent low tower cost. The light weight of the open frame-work construction and the pivotal connections of the side members to the upper and lower rectangular center frames 26 and 28 permit erection of the tower with minimum effort and with lightweight hoisting equipment as described below. Access to the platform through central opening 25 in frame 26 is convenient and safe, and further readily adapts the tower for enclosure above and below platform 22 without impairment of accessibility to the platform. Towers made in accordance with this invention are suitable for platform heights of twenty-five feet or more above the ground.

An important feature of this tower construction is the ease and convenience with which it may be erected. This is illustrated in FIGURES 6-12, inclusive. The erection operation is begun with an upright center column 62, see FIGURE 6, which is used for hoisting parts of the tower frame into elevated positions. Column 62 may be made of two or more telescoping sections for convenience in storage and transportation, and has a transverse arm 63 at its upper end from which a pair of sheaves 65 are supported. Rectangular frames 26 and 28 are stacked at the base of the column, each rectangular frame having a spider 67, see FIGURES 7 and 8, removably connected thereto and slidably fitted over the column for locating the rectangular frame coaxially of the column. Each spider 67 has radial arms 68, preferably I-beams or the like, removably supported on frame sides 26' by angle brackets 69 and having a hub 70 slidably engageable with column 62. A pair of lift eyes 71 secured to the upper part of opposite spider arms 68 on rectangular frame 26 are engaged by blocks 72, which together with sheaves 65 provide the means for hoisting the frame parts into position.

A frames 10a and 10b are connected at their inner convergent ends to opposite sides of upper frame 26. Cables 74 which pass through sheaves 65 serve to hoist upper frame 26 vertically on column 62 to the desired platform height as shown in FIGURE 9, the A frames 10a, 10b being drawn up and into the slanted position shown. Thereafter ball elements 53 are inserted in the lower ends of the pyramidal frame side members and are engaged in the sockets 54 of corner plates 55 as shown in FIGURE 10. Diagonal members 57 are connected between the corners of lower rectangular frame 28 and opposite corner plates 55 and tension rods 60 are added to complete the base assembly. Blocks 72 are then disconnected from spider 67 of upper rectangular frame 26 for use in hoisting components of pyramidal frame 15 into position.

The divergent ends of A frames 15a and 15b, see FIGURE 11, are connected to trapezoidal floor sections 30 and 32, and the opposite ends of the side members 16, 17, 18 and 19 comprising these frames are pivotally attached to the clevis connectors 52 on lower rectangular frame 28 and both subassemblies are pivotally lifted upward by the hoisting apparatus until the inner ends of the floor sections engage the upper frame 26 to which they are subsequently bolted.

Figure 12:
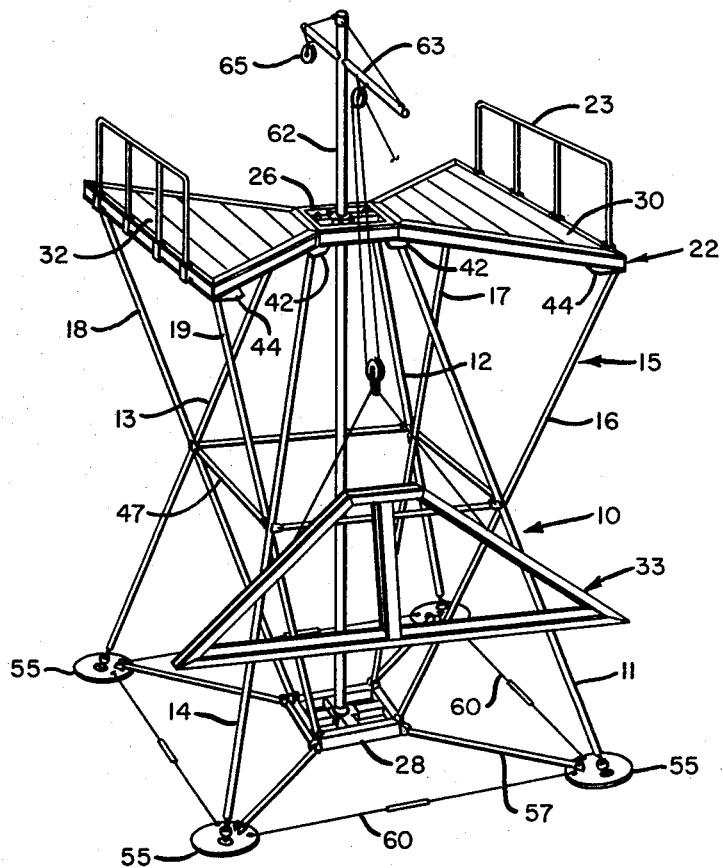

The remaining floor sections 31 and 33 are hoisted, see FIGURE 12, by the hoisting apparatus into the plane of the connected sections 30 and 32 and are bolted to those sections as well as to the rectangular frame 26 to complete the tower structure.

Upon completion of the tower assembly, spiders 67 are disconnected from rectangular frames 26 and 28 and together with the column 62 and the associated hoisting units are removed from the tower. A cover plate may be secured over the upper rectangular frame 26 if desired.

Changes, modifications and improvements may be made to the above-described preferred embodiment of the invention without departing from the scope of the invention. The appended claims define the essential feature of novelty in the invention.

What is claimed is:

1. A tower adapted to support objects at an elevated position above a supporting surface and having a vertical axis comprising
    first and second coaxially disposed truncated pyramidal frames inverted relative to each other,
    upper and lower coaxial disposed open frames at said elevated position and at the supporting surface, respectively,
    means for connecting the convergent end of said first frame to said upper frame,
    means for connecting the convergent end of said second frame to said lower frame,
    means for connecting the divergent end of the first frame to the lower frame,
    a platform at said elevated position, and
    means for connecting said platform to the divergent end of the second frame and to the upper frame.

2. A collapsible tower having a vertical axis and adapted to support objects at an elevated plane above a supporting surface comprising
    a first coaxial frame at said elevated plane,
    a second coaxial frame on said surface,
    a first support frame having four side members supported on said surface at positions substantially spaced from said axis and from each other and converging in a vertical direction toward each other,
    means for directly connecting the convergent ends of the side members to the first coaxial frame,
    rigid diagonal members parallel to said surface and connecting said side members, respectively, to said second coaxial frame,
    a second support frame having four side members connected to said second coaxial frame and diverging from each other in the vertical direction,
    means for interconnecting adjacent side members of said first and second support frames intermediately of the supporting surface and said elevated plane, and
    a rectangular platform at said elevated plane comprising four similarly shaped sections connected to said first coaxial frame and to the side members of the second support frame.

3. A collapsible tower having an axis and being adapted to support objects at an elevated plane above a supporting surface comprising
    an upper coaxial frame at said elevated plane,
    a lower coaxial frame at said supporting surface,
    a first pair of trapezoidally-shaped support frames on opposite sides of said axis pivotally connected at the convergent ends thereof to said upper frame,
    said support frames being supported at their divergent ends on said surface and converging therefrom toward the upper frame,
    a second pair of trapezoidally-shaped support frames on opposite sides of said axis pivotally connected at the convergent ends thereof to the lower frame, the second pair of frames extending between the first pair of frames in planes transverse to the planes of the latter, a platform, and means for connecting said platform to the divergent ends of the second pair of frames and to the upper coaxial frame.

4. A tower having a vertical axis and adapted to support objects at a predetermined height above a supporting surface comprising a lower coaxial frame on said surface, four corner plates on said supporting surface equally spaced from and rigidly secured to said lower coaxial frame, a first support frame having two pairs of side members engaging said corner plates, respectively, said members converging toward each other and toward the tower axis in a vertical direction, an upper coaxial open frame at said predetermined height above the surface, means for pivotally connecting said side members to said upper frame, a transverse brace interconnecting the side members of each of said pairs at substantially one-half of the predetermined height above said surface, a second support frame having two pairs of side members pivotally connected to said lower coaxial frame, the last named members diverging from each other and the tower axis in a vertical direction, a transverse brace interconnecting the side members of each pair in the second support frame at substantially one-half of the predetermined height above said surface, means for releasably connecting each pair of adjacent side members of the first and second support frames, respectively, a platform extending transversely of the tower axis at said predetermined height above the surface comprising four sections releasably secured together, each section being secured to the upper coaxial frame and to the side members of the second support frame.

5. The method of erecting a vertical tower on a supporting surface, the tower having an elevated platform with a central access opening therein, consisting of the steps of removably connecting hoisting apparatus to one end of an elongated column, removably mounting a pair of coaxial frames in stacked relation on the other end of the column, supporting the column vertically on said surface with the hoisting equipment at the top and said frames at the bottom thereof, disposing a first pair of converging support frames on opposite sides of the column and pivotally connecting the convergent ends thereof to the upper coaxial frame, hoisting said upper frame vertically on the column to a predetermined height about the supporting surface whereby the planes of said support frames diverge from the upper frame to the surface, disposing a second pair of converging support frames on opposite sides of the column between the first pair of frames and pivotally connecting the convergent ends of the former to the lower coaxial frame, each frame of the second pair of frames having a platform section connected to the divergent end thereof and projecting transversely upwardly of the plane thereof, pivotally hoisting the second pair of frames about the lower coaxial frame until the platform sections engage the upper coaxial frame whereby the planes of the second pair of frames converge from the platform sections to the lower coaxial frame, connecting the platform sections to the upper frame, hoisting two similar platform sections to said predetermined height above the surface and connecting the same to opposite sides of the other platform sections, and removing said column and hoisting equipment from the structure.

6. The method of erecting a vertical tower on a supporting surface, the tower having an elevated platform with a central access opening therein, consisting of the steps of supporting the column vertically on said surface with a stacked pair of coaxial frames mounted thereon at the bottom, pivotally connecting the adjacent ends of a first pair of support frames to opposite sides of the upper coaxial frame, raising said upper frame on the column to a predetermined height about the supporting surface, pivotally connecting a second pair of frames to other opposed sides of the lower coaxial frame, each frame of the second pair of frames having a platform section connected to the end thereof remote from the lower coaxial frame and projecting transversely upwardly of the plane thereof, pivotally raising the second pair of frames about the lower coaxial frame until the platform sections engage the upper coaxial frame, connecting the platform sections to the upper frame, connecting other similar platform sections to the first named platform sections, and removing said column from the structure.

References Cited by the Examiner

UNITED STATES PATENTS

| | | | |
|---|---|---|---|
| 508,078 | 11/93 | Baker | 189—19 X |
| 967,803 | 8/10 | Mercer | 182—179 X |
| 1,119,631 | 12/14 | Osenburg | 189—12 |
| 1,231,823 | 7/17 | Weasler | 182—187 X |
| 1,539,109 | 5/25 | Brandt | 189—19 X |

HARRISON R. MOSELEY, *Primary Examiner.*

REINALDO P. MACHADO, *Examiner.*